(12) United States Patent
Yoo et al.

(10) Patent No.: US 11,459,457 B2
(45) Date of Patent: Oct. 4, 2022

(54) THERMOPLASTIC RESIN COMPOSITION

(71) Applicant: LG CHEM, LTD., Seoul (KR)

(72) Inventors: Je Sun Yoo, Daejeon (KR); Ki Young Nam, Daejeon (KR); Yong Yeon Hwang, Daejeon (KR); Jae Yong Sim, Daejeon (KR); Seon Hyeong Bae, Daejeon (KR); Jae Yeon Bae, Daejeon (KR); In Seok Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 95 days.

(21) Appl. No.: 16/771,175

(22) PCT Filed: Apr. 5, 2019

(86) PCT No.: PCT/KR2019/004034
§ 371 (c)(1),
(2) Date: Jun. 9, 2020

(87) PCT Pub. No.: WO2019/194620
PCT Pub. Date: Oct. 10, 2019

(65) Prior Publication Data
US 2021/0198484 A1 Jul. 1, 2021

(30) Foreign Application Priority Data

Apr. 6, 2018 (KR) .......................... 10-2018-0040547
Apr. 4, 2019 (KR) .......................... 10-2019-0039719

(51) Int. Cl.
| | |
|---|---|
| *C08L 71/12* | (2006.01) |
| *C08K 5/50* | (2006.01) |
| *C08K 5/5313* | (2006.01) |
| *C08K 5/5397* | (2006.01) |
| *C08L 51/04* | (2006.01) |

(52) U.S. Cl.
CPC .............. *C08L 71/123* (2013.01); *C08K 5/50* (2013.01); *C08K 5/5313* (2013.01); *C08K 5/5397* (2013.01); *C08L 51/04* (2013.01)

(58) Field of Classification Search
CPC ......... C08L 71/123; C08L 51/04; C08K 5/50; C08K 5/5313; C08K 5/5397
See application file for complete search history.

(56) References Cited

U.S. PATENT DOCUMENTS

| | | | | |
|---|---|---|---|---|
| 3,639,506 | A | * | 2/1972 | Haaf ...................... C08K 5/521 |
| | | | | 524/508 |
| 5,308,565 | A | * | 5/1994 | Weber ........................ C08J 5/24 |
| | | | | 162/101 |
| 9,631,091 | B2 | | 4/2017 | Lim et al. |
| 10,301,503 | B2 | | 5/2019 | Lim et al. |
| 2007/0221890 | A1 | | 9/2007 | Gan |
| 2013/0105745 | A1 | | 5/2013 | Xalter et al. |
| 2013/0168618 | A1 | | 7/2013 | Jang et al. |
| 2016/0017146 | A1 | | 1/2016 | Lim et al. |
| 2016/0130406 | A1 | | 5/2016 | Hsieh et al. |
| 2017/0174884 | A1 | | 6/2017 | Park et al. |
| 2017/0260363 | A1 | | 9/2017 | Pfaendner et al. |
| 2017/0260366 | A1 | | 9/2017 | Pfaendner et al. |
| 2017/0306175 | A1 | | 10/2017 | Lim et al. |
| 2020/0140621 | A1 | | 5/2020 | Hsieh et al. |

FOREIGN PATENT DOCUMENTS

| | | |
|---|---|---|
| CN | 1960997 A | 5/2007 |
| CN | 101781451 B | 12/2011 |
| CN | 102432990 A | 5/2012 |
| CN | 106715588 A | 5/2017 |
| DE | 3234033 A1 | 3/1984 |
| EP | 2610304 A1 | 7/2013 |
| JP | 47-022088 B * | 6/1972 |
| JP | 2002-105334 A | 4/2002 |
| KR | 10-2013-0026520 A | 3/2013 |
| KR | 10-2015-0035236 A | 4/2015 |
| KR | 10-2016-0077553 A | 7/2016 |
| KR | 10-2017-0057381 A | 5/2017 |
| KR | 10-2017-0008660 A | 1/2020 |
| KR | 10-2017-0013515 A | 2/2020 |
| WO | WO2019194620 | 10/2019 |

OTHER PUBLICATIONS

English machine translation of CN 101781451 B. (Year: 2011).*
English machine translation of JP 47-22088 B (Year: 1972).*
European Office Action for WP 198780804.1; dated May 6, 2021; 8 pages.

* cited by examiner

*Primary Examiner* — John E Uselding

(57) ABSTRACT

Provided is a thermoplastic resin composition which includes: a base resin including a polyarylene oxide-based polymer at 100 parts by weight; and an additive including one or more selected from the group consisting of compounds represented by Chemical Formula 1-1 to Chemical Formula 1-3 at 0.1 to 5 parts by weight, and can be used for producing a thermoplastic resin molded article which exhibits an excellent coloring property and thus has an aesthetically pleasing appearance.

14 Claims, No Drawings

THERMOPLASTIC RESIN COMPOSITION

CROSS-REFERENCE TO RELATED APPLICATION

The present application is a National Phase entry of International Application No. PCT/KR2019/004034, filed Apr. 5, 2019, which claims priority to and the benefit of Korean Patent Application No. 10-2018-0040547, filed on Apr. 6, 2018, and Korean Patent Application No. 10-2019-0039719, filed on Apr. 4, 2019, the disclosures of which are incorporated herein by reference in their entirety.

TECHNICAL FIELD

Technical Field

The present invention relates to a thermoplastic resin composition, and particularly, to a thermoplastic resin composition capable of producing a thermoplastic resin molded article having a high whiteness index.

Background Art

A polyarylene oxide-based polymer is excellent in heat resistance, electrical properties, low-temperature characteristics, and dimensional stability, and also has excellent hydrolytic stability due to its low hygroscopicity, but exhibits low moldability due to its high processing temperature. In order to compensate for this disadvantage, a method of improving moldability by using a mixture of the polyarylene oxide-based polymer and polystyrene or high-impact polystyrene has been proposed. Since compatibility of the polyarylene oxide-based polymer with polystyrene and high-impact polystyrene is excellent regardless of respective contents, they can complement each other.

Meanwhile, the appearance of a molded article made of a thermoplastic resin composition including the polyarylene oxide-based polymer needs to be excellent because it is usually used in common electric/electronic products, especially, computer housings, TV deflection devices, other office machines, and the like.

However, since a molded article made of a thermoplastic resin composition including the polyarylene oxide-based polymer has a significantly low whiteness index, it exhibits a low coloring property, and thus is not capable of realizing an aesthetically pleasing appearance.

DISCLOSURE

Technical Problem

The present invention is directed to providing a thermoplastic resin composition capable of producing a thermoplastic resin molded article having a high whiteness index.

Technical Solution

One aspect of the present invention provides a thermoplastic resin composition which includes: a base resin including a polyarylene oxide-based polymer at 100 parts by weight; and an additive including one or more selected from the group consisting of compounds represented by Chemical Formula 1-1 to Chemical Formula 1-3 below at 0.1 to 5 parts by weight:

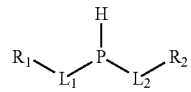

<Chemical Formula 1-1>

In Chemical Formula 1-1, $L_1$ and $L_2$ each independently are a direct bond, a divalent heteroatom, a substituted or unsubstituted $C_3$ to $C_{10}$ cyclic alkylene group, or a substituted or unsubstituted $C_6$ to $C_{20}$ arylene group, and $R_1$ and $R_2$ each independently are hydrogen, a halogen group, a hydroxyl group, a cyano group, a nitro group, a substituted or unsubstituted $C_1$ to $C_{10}$ linear alkyl group, a substituted or unsubstituted $C_3$ to $C_{10}$ cyclic alkyl group, or a substituted or unsubstituted $C_6$ to $C_{20}$ aryl group.

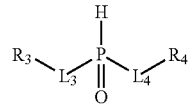

<Chemical Formula 1-2>

In Chemical Formula 1-2, $L_3$ and $L_4$ each independently are a direct bond, a divalent heteroatom, a substituted or unsubstituted $C_3$ to $C_{10}$ cyclic alkylene group, or a substituted or unsubstituted $C_6$ to $C_{20}$ arylene group, and $R_3$ and $R_4$ each independently are hydrogen, a halogen group, a hydroxyl group, a cyano group, a nitro group, a substituted or unsubstituted $C_1$ to $C_{10}$ linear alkyl group, a substituted or unsubstituted $C_3$ to $C_{10}$ cyclic alkyl group, or a substituted or unsubstituted $C_6$ to $C_{20}$ aryl group.

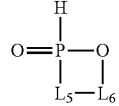

<Chemical Formula 1-3>

In Chemical Formula 1-3, $L_5$ and $L_6$ each independently are a direct bond, a substituted or unsubstituted $C_3$ to $C_{10}$ cyclic alkylene group, or a substituted or unsubstituted $C_6$ to $C_{20}$ arylene group, provided that $L_5$ and $L_6$ are not both direct bonds.

Advantageous Effects

A molded article made of a thermoplastic resin composition according to the present invention has a high whiteness index, and thus exhibits an excellent coloring property, so that an aesthetically pleasing appearance can be realized.

BEST MODE

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, a weight-average molecular weight may be measured as a relative value with respect to standard polystyrene (PS) by gel permeation chromatography (GPC; Waters Breeze) using tetrahydrofuran (THF).

In the present invention, an average particle size may be defined as a particle size corresponding to the 50% or more in the cumulative volume-based particle size distribution curve.

In the present invention, the average particle size of a conjugated diene-based polymer may be measured by laser diffraction particle size analysis.

In the present invention, the linear alkyl group may be a straight-chain or branched alkyl group, and may be further substituted with other substituents.

Specific examples of the linear alkyl group include a methyl group, a cyclopentyl methyl group, a cyclohexyl methyl group, an ethyl group, an n-propyl group, an isopropyl group, a 1-ethylpropyl group, a 1,1-dimethylpropyl group, an n-butyl group, an isobutyl group, a tert-butyl group, a sec-butyl group, a 1-methylbutyl group, a 1-ethylbutyl group, a 2-ethylbutyl group, a 3,3-dimethylbutyl group, an n-pentyl group, an isopentyl group, a neopentyl group, a tert-pentyl group, a 1-methylpentyl group, a 2-methylpentyl group, a 4-methyl-2-pentyl group, a 2-propylpentyl group, an n-hexyl group, an isohexyl group, a 1-methylhexyl group, a 4-methylhexyl group, a 5-methylhexyl group, a 2-ethylhexyl group, an n-heptyl group, a tert-heptyl group, a 2,2-dimethylheptyl group, an n-octyl group, a tert-octyl group, an n-nonyl group, a tert-nonyl group, and the like, but the present invention is not limited thereto.

In the present invention, the cyclic alkyl group is monocyclic or polycyclic, and may be further substituted with other substituents. Here, being polycyclic means that in the group, a cyclic alkyl group is directly linked to or condensed with another ring group. Here, the other ring group may be a cyclic alkyl group, but it may also be other type of ring group, for example, a heterocyclic alkyl group, an aryl group, a heteroaryl group, or the like. Specific examples of the cyclic alkyl group include a cyclopropyl group, a cyclobutyl group, a cyclopentyl group, a 3-methylcyclopentyl group, a 2,3-dimethylcyclopentyl group, a cyclohexyl group, a 3-methylcyclohexyl group, a 4-methylcyclohexyl group, a 2,3-dimethylcyclohexyl group, a 3,4,5-trimethylcyclohexyl group, a 4-tert-butylcyclohexyl group, a cycloheptyl group, a cyclooctyl group, and the like, but the present invention is not limited thereto.

In the present invention, the alkylene group means an alkyl group having two binding sites (i.e., a divalent alkyl group). The above-description of the alkyl group can be applied to describe the alkyl group included in the alkylene group except that the alkyl group is divalent.

In the present invention, the alkoxy group means an alkyl group bonded to oxygen, and the above-description of the alkyl group can be applied to describe the alkyl group included in the alkoxy group.

In the present invention, the aryl group is monocyclic or polycyclic, and may be further substituted with other substituents. Here, being polycyclic means that in the group, an aryl group is directly linked to or condensed with another ring group. Here, the other ring group may be an aryl group, but it may also be other type of ring group, for example, a cycloalkyl group, a heterocycloalkyl group, a heteroaryl group, or the like.

Specific examples of the aryl group include a phenyl group, a biphenyl group, a triphenyl group, a naphthyl group, an anthryl group, a chrysenyl group, a phenanthrenyl group, a perylenyl group, a fluoranthenyl group, a triphenylenyl group, a phenalenyl group, a pyrenyl group, a tetracenyl group, a pentacenyl group, a fluorenyl group, an indenyl group, an acenaphthylenyl group, a benzofluorenyl group, a spirobifluorenyl group, a 2,3-dihydro-1H-indenyl group, condensed ring groups thereof, and the like, but the present invention is not limited thereto.

In the present invention, the arylene group means an aryl group having two binding sites (i.e., a divalent aryl group). The above-description of the aryl group can be applied to describe the aryl group included in the arylene group except that the aryl group is divalent.

In the present invention, the divalent heteroatom may be oxygen or sulfur.

In the present invention, the "substituted or unsubstituted" refers to being substituted with one or more substituents selected from the group consisting of a hydroxyl group, a halogen group, a cyano group, a $C_1$ to $C_{10}$ linear alkyl group, a $C_3$ to $C_{10}$ cyclic alkyl group, a $C_1$ to $C_{10}$ alkoxy group, and a $C_6$ to $C_{20}$ aryl group or being unsubstituted, being substituted with a substituent bonded to two or more of the substituents or being unsubstituted; or being substituted with a substituent in which two or more substituents selected from the substituents are linked or being unsubstituted. For example, the "substituent in which two or more substituents are linked" may be a biphenyl group. That is, the biphenyl group may be an aryl group, and may be interpreted as a substituent in which two phenyl groups are linked.

1. Thermoplastic Resin Composition

A thermoplastic resin composition according to an embodiment of the present invention includes: a base resin including a polyarylene oxide-based polymer at 100 parts by weight; and an additive including one or more selected from the group consisting of compounds represented by Chemical Formula 1-1 to Chemical Formula 1-3 below at 0.01 to 5 parts by weight:

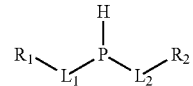

<Chemical Formula 1-1>

In Chemical Formula 1-1, $L_1$ and $L_2$ each independently are a direct bond, a divalent heteroatom, a substituted or unsubstituted $C_3$ to $C_{10}$ cyclic alkylene group, or a substituted or unsubstituted $C_6$ to $C_{20}$ arylene group, and $R_1$ and $R_2$ each independently are hydrogen, a halogen group, a hydroxyl group, a cyano group, a nitro group, a substituted or unsubstituted $C_1$ to $C_{10}$ linear alkyl group, a substituted or unsubstituted $C_3$ to $C_{10}$ cyclic alkyl group, or a substituted or unsubstituted $C_6$ to $C_{20}$ aryl group.

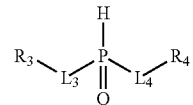

<Chemical Formula 1-2>

In Chemical Formula 1-2, $L_3$ and $L_4$ each independently are a direct bond, a divalent heteroatom, a substituted or unsubstituted $C_3$ to $C_{10}$ cyclic alkylene group, or a substituted or unsubstituted $C_6$ to $C_{20}$ arylene group, and $R_3$ and $R_4$ each independently are hydrogen, a halogen group, a hydroxyl group, a cyano group, a nitro group, a substituted or unsubstituted $C_1$ to $C_{10}$ linear alkyl group, a substituted or unsubstituted $C_3$ to $C_{10}$ cyclic alkyl group, or a substituted or unsubstituted $C_6$ to $C_{20}$ aryl group.

<Chemical Formula 1-3>

In Chemical Formula 1-3, $L_5$ and $L_6$ each independently are a direct bond, a substituted or unsubstituted $C_3$ to $C_{10}$ cyclic alkylene group, or a substituted or unsubstituted $C_6$ to $C_{20}$ arylene group, provided that $L_5$ and $L_6$ are not both direct bonds.

Hereinafter, each component of the thermoplastic resin composition according to an embodiment of the present invention will be described in detail.

1) Base Resin

The base resin includes a polyarylene oxide-based polymer.

The polyarylene oxide-based polymer may impart excellent heat resistance, excellent electrical properties, excellent low-temperature characteristics, excellent dimensional stability, and excellent hydrolytic stability to the thermoplastic resin composition.

The base resin may include a polyarylene oxide-based polymer including a repeat unit represented by Chemical Formula 16 below:

<Chemical Formula 16>

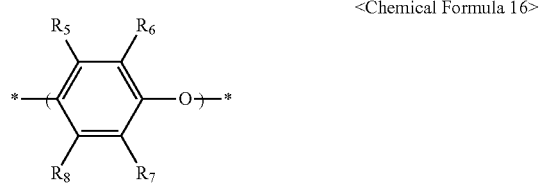

In Chemical Formula 16, $R_5$ to $R_8$ each independently are hydrogen, a halogen group, a hydroxyl group, a cyano group, a nitro group, a substituted or unsubstituted $C_1$ to $C_{10}$ linear alkyl group, a substituted or unsubstituted $C_3$ to $C_{10}$ cyclic alkyl group, a substituted or unsubstituted $C_1$ to $C_{20}$ alkoxy group, or a substituted or unsubstituted $C_6$ to $C_{20}$ aryl group, and n is any one of 4 to 700.

$R_5$ to $R_8$ each independently are preferably hydrogen, a substituted or unsubstituted $C_1$ to $C_{10}$ linear alkyl group, a substituted or unsubstituted $C_1$ to $C_{20}$ alkoxy group, or a substituted or unsubstituted $C_1$ to $C_{20}$ aryl group, with hydrogen or a substituted or unsubstituted $C_1$ to $C_{10}$ linear alkyl group being more preferred.

n is the number of repeat units represented by Chemical Formula 16, and is preferably any one of 100 to 600. When the above-described condition is satisfied, a thermoplastic resin molded article realizing excellent mechanical strength and excellent processability can be produced.

The polyarylene oxide-based polymer may be a homopolymer or a copolymer.

The polyarylene oxide-based homopolymer may include, for example, one or more selected from the group consisting of poly(2,6-dimethyl-1,4-phenylene oxide), poly(2,6-diethyl-1,4-phenylene oxide), poly(2-methyl-6-propyl-1,4-phenylene oxide), poly(2,6-dimethoxy-1,4-phenylene oxide), poly(2,6-dichloromethyl-1,4-phenylene oxide), poly(2,6-dibromomethyl-1,4-phenylene oxide), poly(2,6-diphenylphenylene oxide), and poly(2,5-dimethyl-1,4-phenylene oxide), with poly(2,6-dimethyl-1,4-phenylene oxide) being preferred.

The polyarylene oxide-based copolymer may include, for example, one or more selected from the group consisting of a copolymer including a 2,6-dimethylphenol-derived unit and a 2,3,6-trimethylphenol-derived unit; a copolymer including a 2,6-dimethylphenol-derived unit and an o-cresol-derived unit; and a copolymer including a 2,3,6-trimethylphenol-derived unit and an o-cresol-derived unit.

Meanwhile, the base resin may further include other polymers or copolymers in addition to the polyarylene oxide-based polymer. For example, the base resin may further include one or more selected from the group consisting of an aromatic vinyl-based polymer and a graft copolymer prepared by graft polymerization of a conjugated diene-based polymer with an aromatic vinyl-based monomer.

The aromatic vinyl-based polymer may impart excellent moldability to the thermoplastic resin composition.

The aromatic vinyl-based polymer may be a polymer including units derived from an aromatic vinyl-based monomer. The units derived from an aromatic vinyl-based monomer may be one or more selected from the group consisting of the units derived from styrene, α-methylstyrene, α-ethylstyrene, and p-methylstyrene, with the units derived from styrene being preferred.

The aromatic vinyl-based polymer may have a weight-average molecular weight of 100,000 to 400,000 g/mol or 150,000 to 300,000 g/mol, with the range of 150,000 to 300,000 g/mol being preferred. When the above-described range is satisfied, both processability and physical rigidity can be excellent.

The aromatic vinyl-based polymer may be an aromatic vinyl-based homopolymer and is preferably polystyrene.

The aromatic vinyl-based polymer may be directly prepared, or it may be a commercially available material.

The graft copolymer may impart excellent moldability and excellent mechanical properties to the thermoplastic resin composition.

The conjugated diene-based polymer of the graft copolymer may be a conjugated diene-based rubber polymer. The conjugated diene-based polymer may have an average particle size of 0.8 to 20 μm or 1 to 10 μm, with the range of 1 to 10 μm being preferred. When the above-described average particle size is satisfied, the mechanical properties of the graft copolymer can be improved, and matte characteristics can be realized.

Examples of the unit derived from an aromatic vinyl-based monomer have been described above.

The graft copolymer may be prepared by graft copolymerization of the conjugated diene-based polymer and the aromatic vinyl-based monomer in a weight ratio of 3:97 to 15:85 or 5:95 to 10:90, with the range of 5:95 to 10:90 being preferred. When the above-described range is satisfied, the mechanical properties, rigidity, chemical resistance, and moldability of the graft copolymer can be improved.

The graft copolymer is preferably high-impact polystyrene (HIPS).

The graft copolymer may be directly prepared, or it may be a commercially available material.

The base resin may include the polyarylene oxide-based polymer and one or more selected from the group consisting of the aromatic vinyl-based polymer and the graft copolymer in a weight ratio of 50:50 to 10:90 or 40:60 to 20:80, with the range of 40:60 to 20:80 being preferred. When the above-described range is satisfied, a thermoplastic resin composition excellent in moldability and mechanical properties as well as heat resistance, electrical properties, low-temperature characteristics, hydrolytic stability, and dimensional stability can be prepared.

2) Additive

The additive includes one or more selected from the group consisting of compounds represented by Chemical Formula 1-1 to Chemical Formula 1-3 below, and may impart a high whiteness index to the thermoplastic resin composition:

<Chemical Formula 1-1>

In Chemical Formula 1-1, $L_1$ and $L_2$ each independently are a direct bond, a divalent heteroatom, a substituted or unsubstituted $C_3$ to $C_{10}$ cyclic alkylene group, or a substituted or unsubstituted $C_6$ to $C_{20}$ arylene group, and $R_1$ and $R_2$ each independently are hydrogen, a halogen group, a hydroxyl group, a cyano group, a nitro group, a substituted or unsubstituted $C_1$ to $C_{10}$ linear alkyl group, a substituted or unsubstituted $C_3$ to $C_{10}$ cyclic alkyl group, or a substituted or unsubstituted $C_6$ to $C_{20}$ aryl group.

<Chemical Formula 1-2>

In Chemical Formula 1-2, $L_3$ and $L_4$ each independently are a direct bond, a divalent heteroatom, a substituted or unsubstituted $C_3$ to $C_{10}$ cyclic alkylene group, or a substituted or unsubstituted $C_6$ to $C_{20}$ arylene group, and $R_3$ and $R_4$ each independently are hydrogen, a halogen group, a hydroxyl group, a cyano group, a nitro group, a substituted or unsubstituted $C_1$ to $C_{10}$ linear alkyl group, a substituted or unsubstituted $C_3$ to $C_{10}$ cyclic alkyl group, or a substituted or unsubstituted $C_6$ to $C_{20}$ aryl group.

<Chemical Formula 1-3>

In Chemical Formula 1-3, $L_5$ and $L_6$ each independently are a direct bond, a substituted or unsubstituted $C_3$ to $C_{10}$ cyclic alkylene group, or a substituted or unsubstituted $C_6$ to $C_{20}$ arylene group, provided that $L_5$ and $L_6$ are not both direct bonds.

The direct bond means that P and $R_1$ are directly bonded without $L_1$, or P and $R_2$ are directly bonded without $L_2$. In addition, the direct bond means that P and $R_3$ are directly bonded without $L_3$, or P and $R_4$ are directly bonded without $L_4$. Additionally, the direct bond means that $L_6$ is directly bonded to P without $L_5$, or $L_5$ is directly bonded to 0 without $L_6$.

The compounds represented by Chemical Formula 1-1 to Chemical Formula 1-3 are metal-salt-free hypophosphite ester compounds, and may impart a high whiteness index to the thermoplastic resin composition due to a P—H bond. In addition, since the compounds represented by Chemical Formula 1-1 to Chemical Formula 1-3 have excellent compatibility with the base resin, they may impart a high whiteness index without degrading the basic properties, i.e., mechanical properties and surface characteristics, of the thermoplastic resin composition.

However, since a hypophosphite metal salt has significantly low compatibility with the base resin, not only an effect of improving the whiteness index of the thermoplastic resin composition is insignificant, but also basic properties, i.e., mechanical properties and surface characteristics, are significantly degraded.

In addition, compounds in which P of Chemical Formula 1-1 to Chemical Formula 1-3 is bonded to other substituents such as an alkyl group, an aryl group, and the like other than hydrogen (H) may not realize an effect of improving a whiteness index of the thermoplastic resin composition at all.

Meanwhile, the additive may include one or more selected from the group consisting of compounds represented by Chemical Formula 2 to Chemical Formula 4 below:

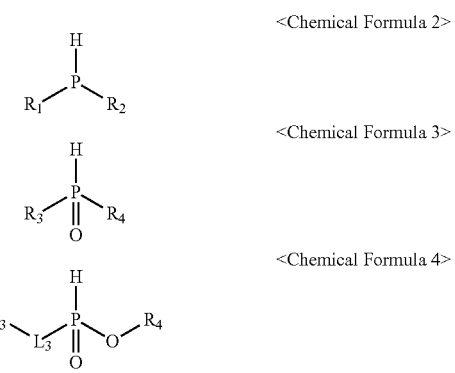

<Chemical Formula 2>

<Chemical Formula 3>

<Chemical Formula 4>

In Chemical Formula 2 to Chemical Formula 4, $L_3$ each independently is a direct bond, a substituted or unsubstituted $C_3$ to $C_{10}$ cyclic alkylene group, or a substituted or unsubstituted $C_6$ to $C_{20}$ arylene group, and $R_1$ to $R_4$ are as defined in Chemical Formula 1-1 and Chemical Formula 1-2.

In Chemical Formula 2, $R_1$ and $R_2$ each independently may be hydrogen, a substituted or unsubstituted $C_1$ to $C_{10}$ linear alkyl group, a substituted or unsubstituted $C_3$ to $C_{10}$ cyclic alkyl group, or a substituted or unsubstituted $C_6$ to $C_{20}$ aryl group, with hydrogen or a substituted or unsubstituted $C_6$ to $C_{20}$ aryl group being preferred.

In Chemical Formula 3, $R_3$ and $R_4$ each independently may be hydrogen, a substituted or unsubstituted $C_1$ to $C_{10}$ linear alkyl group, a substituted or unsubstituted $C_3$ to $C_{10}$ cyclic alkyl group, or a substituted or unsubstituted $C_6$ to $C_{20}$ aryl group, with a substituted or unsubstituted $C_6$ to $C_{20}$ aryl group being preferred.

In Chemical Formula 4, $L_3$ is preferably a direct bond or a substituted or unsubstituted $C_3$ to $C_{10}$ cyclic alkylene group.

In Chemical Formula 4, $R_3$ and $R_4$ each independently may be hydrogen, a hydroxyl group, a substituted or unsubstituted $C_1$ to $C_{10}$ linear alkyl group, a substituted or unsubstituted $C_3$ to $C_{10}$ cyclic alkyl group, or a substituted or unsubstituted $C_6$ to $C_{20}$ aryl group, with hydrogen, a hydroxyl group, a substituted or unsubstituted $C_1$ to $C_{10}$ linear alkyl group, or a substituted or unsubstituted $C_6$ to $C_{20}$ aryl group being preferred.

Meanwhile, in Chemical Formula 1-3, $L_5$ and $L_6$ each independently are preferably a substituted or unsubstituted $C_6$ to $C_{20}$ arylene group. When the above-described conditions are satisfied, the whiteness index of the thermoplastic resin composition can be improved, and degradation of mechanical properties can also be minimized.

In addition, the additive may include one or more selected from the group consisting of compounds represented by Chemical Formulas 5 to 12 below, with one or more selected from the group consisting of compounds represented by Chemical Formulas 5 to 8 and 12 below being preferred.

<Chemical Formula 5>

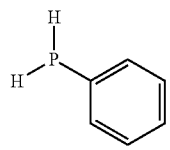

<Chemical Formula 6>

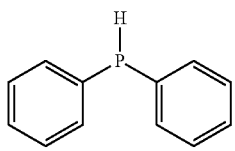

<Chemical Formula 7>

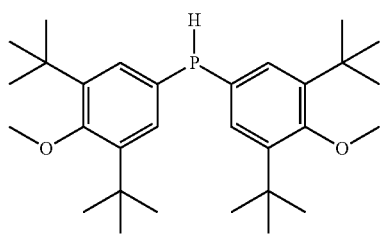

<Chemical Formula 8>

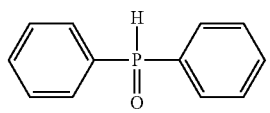

<Chemical Formula 9>

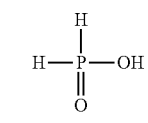

<Chemical Formula 10>

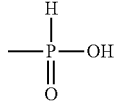

<Chemical Formula 11>

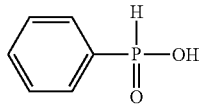

<Chemical Formula 12>

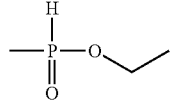

<Chemical Formula 13>

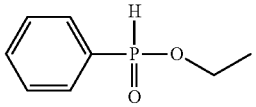

<Chemical Formula 14>

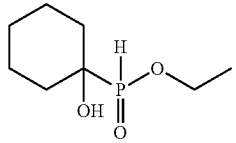

<Chemical Formula 15>

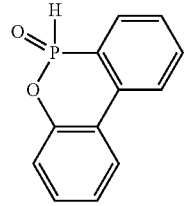

The additive is included at 0.1 to 5 parts by weight, preferably, 1 to 3 parts by weight with respect to 100 parts by weight of the base resin. When the above-described range is satisfied, a significantly high whiteness index can be realized without degrading the thermal deformation characteristics and basic properties of a thermoplastic resin molded article. Below the above-described range, an effect of improving a whiteness index is insignificant, and above the above-described range, impact strength is significantly degraded.

The thermoplastic resin composition according to an embodiment of the present invention may further include a flame retardant to improve flame retardancy.

The types of the flame retardant are not particularly limited, and the flame retardant may be one or more selected from the group consisting of a phosphonate ether-based compound, a phosphine, a phosphine oxide-based compound, and a phosphate-based compound. In consideration of compatibility of the flame retardant with the compounds represented by Chemical Formulas 1-1 to 1-3, a phosphate-based compound is preferably used.

The phosphate-based compound may be one or more selected from the group consisting of triphenyl phosphate, resorcinol bis(diphenyl phosphate), and bisphenol-A bis (diphenyl phosphate).

The flame retardant may be included at 3 to 40 parts by weight or 8 to 30 parts by weight with respect to 100 parts by weight of the base resin, with the range of 8 to 30 parts by weight being preferred. When the above-described range is satisfied, high flame retardancy can be ensured, and the balance among properties can also be excellent.

[Modes of the Invention]

Hereinafter, the present invention will be described in detail with reference to embodiments so that those skilled in the art can easily carry out the present invention.

However, the present invention may be embodied in several different forms, and therefore, is not limited to embodiments described herein.

Examples and Comparative Examples

The details of the components used in Examples and Comparative Examples below are as follows.

(A) Base resin (A-1) Polyarylene oxide-based polymer: poly(2,6-dimethyl-1,4-phenylene oxide) (weight-average molecular weight: 30,000 g/mol) was used.

(A-2) Aromatic vinyl-based polymer: polystyrene (weight-average molecular weight: 200,000 g/mol) was used.

(A-3) Graft copolymer: 65IHE (high-impact polystyrene (HIPS)) manufactured by LG Chem. was used.

(B) Additive (B-1) Phenylphosphine

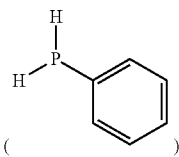

manufactured by Sigma-Aldrich Inc. was used.

(B-2) Diphenylphosphine

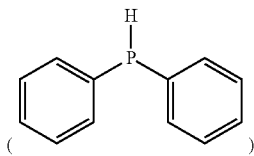 [SMILES: c1ccc(Pc2ccccc2)cc1]

manufactured by Sigma-Aldrich Inc. was used.

(B-3) Bis(3,5-di-tert-butyl-4-methoxyphenyl)phosphine

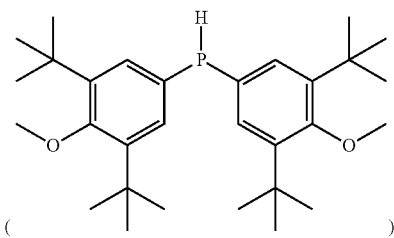 [SMILES: COc1c(C(C)(C)C)cc(Pc2cc(C(C)(C)C)c(OC)c(C(C)(C)C)c2)cc1C(C)(C)C]

manufactured by Sigma-Aldrich Inc. was used.

(B-4) Diphenylphosphine oxide

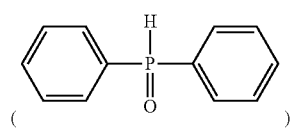

manufactured by Sigma-Aldrich Inc. was used.

(B-5) 9,10-Dihydro-9-oxa-10-phosphaphenanthrene-10-oxide

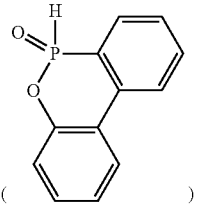 [SMILES: O=[PH]1Oc2ccccc2-c2ccccc21]

manufactured by Sanko Co., Ltd was used.

(C) Metal salt of phosphinic acid: Exolit® OP 1230 (aluminum diethyl phosphinate,

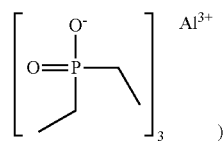

manufactured by Clariant was used.

(D) Euphos HCA-HQ (10-(2,5-dihydrophenyl)-9,10-dihydro-9-oxa-10-phosphaphenanthrene-10-oxide,

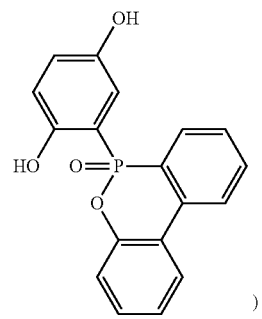 [SMILES: O=P1(c2cc(O)ccc2O)Oc2ccccc2-c2ccccc21]

manufactured by Eutec Chemical Co., Ltd was used.

(E) GC FR 693 (CAS No. 1184-10-7,

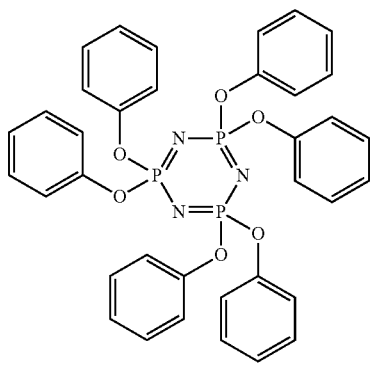

manufactured by GreenChemicals was used.

(F) GC FR 150 (CAS No. 403614-60-8,

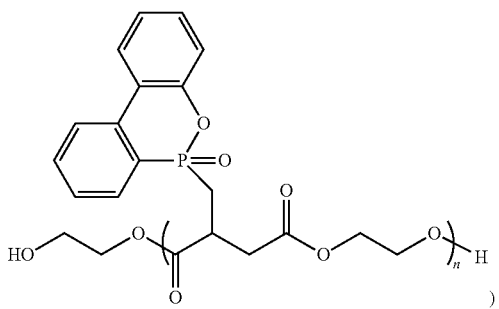

manufactured by GreenChemicals was used.

The components (A) to (E) were mixed in the amounts shown in [Table 1] to [Table 6] below and stirred to prepare thermoplastic resin compositions.

Experimental Example

Each of the thermoplastic resin compositions of Examples and Comparative Examples was uniformly mixed with a lubricant (trade name: L-C 104N, manufactured by Lion Chemical Co., Ltd.) at 0.5 part by weight, a stabilizer (trade name: IR-1076, manufactured by Ciba Inc.) at 0.5 part by weight, and an anti-dripping agent (trade name: CD145E, manufactured by Asahi Kasei Corporation) at 0.1 part by weight, and the mixture was then fed into a twin-screw extruder set at 270° C. and extruded to prepare pellets. Then, the pellets were injection-molded to prepare plaque-like specimens. The properties of the specimens thus prepared were evaluated by the methods described below, and results thereof are shown in [Table 1] to [Table 6] below.

(1) Whiteness index: Chromaticity with respect to the "L" value was measured using a HunterLab color measurement instrument.

The "L" value refers to a value of a coordinate axis indicating an intrinsic color, and may range from 0 to 100. Values closer to 0 indicate a blacker color, and values closer to 100 indicate a whiter color.

(2) Glossiness (%): measured in accordance with ASTM 1003.

(3) Impact strength (kg. cm/cm, ¼ in): measured in accordance with ASTM D256.

(4) Flame retardancy: measured in accordance with an UL-94 test method. Meanwhile, N.R means non-rated.

TABLE 1

| Classification | | Examples | | | | |
|---|---|---|---|---|---|---|
| | | 1 | 2 | 3 | 4 | 5 |
| (A) Base resin (parts by weight) | (A-1) | 100 | 100 | 100 | 100 | 100 |
| | (A-2) | — | — | — | — | — |
| | (A-3) | — | — | — | — | — |
| (B) Additive (parts by weight) | (B-1) | 2 | — | — | — | — |
| | (B-2) | — | 0.1 | 2 | 5 | — |
| | (B-3) | — | — | — | — | 2 |
| | (B-4) | — | — | — | — | — |
| | (B-5) | — | — | — | — | — |
| Whiteness index | | 79 | 74 | 77 | 79 | 75 |
| Glossiness | | 97 | 100 | 100 | 99 | 98 |
| Impact strength | | 12 | 19 | 18 | 15 | 14 |
| Flame retardancy | | V-2 | V-2 | V-2 | V-2 | V-2 |

TABLE 2

| Classification | | Examples | | | | |
|---|---|---|---|---|---|---|
| | | 6 | 7 | 8 | 9 | 10 |
| (A) Base resin (parts by weight) | (A-1) | 100 | 100 | 100 | 100 | 100 |
| | (A-2) | — | — | — | — | — |
| | (A-3) | — | — | — | — | — |
| (B) Additive (parts by weight) | (B-1) | — | — | — | — | — |
| | (B-2) | — | — | — | — | — |
| | (B-3) | — | — | — | — | — |
| | (B-4) | 2 | — | — | — | — |
| | (B-5) | — | 0.1 | 1 | 2 | 5 |
| Whiteness index | | 76 | 74 | 76 | 78 | 83 |
| Glossiness | | 95 | 99 | 100 | 99 | 99 |
| Impact strength | | 13 | 15 | 18 | 14 | 11 |
| Flame retardancy | | V-2 | V-2 | V-2 | V-2 | V-2 |

TABLE 3

| Classification | | Examples | | | | | | |
|---|---|---|---|---|---|---|---|---|
| | | 11 | 12 | 13 | 14 | 15 | 16 | 17 |
| (A) Base resin (parts by weight) | (A-1) | 30 | 30 | 30 | 30 | 30 | 30 | 30 |
| | (A-2) | 70 | 70 | 70 | 70 | — | — | — |
| | (A-3) | — | — | — | — | 70 | 70 | 70 |
| (B) Additive (parts by weight) | (B-1) | — | — | — | — | — | — | — |
| | (B-2) | 0.1 | 0.5 | 2 | 5 | 0.1 | 2 | 5 |
| | (B-3) | — | — | — | — | — | — | — |
| | (B-4) | — | — | — | — | — | — | — |
| | (B-5) | — | — | — | — | — | — | — |
| Whiteness index | | 74 | 78 | 79 | 81 | 74 | 84 | 84 |
| Glossiness | | 98 | 98 | 100 | 100 | 52 | 55 | 60 |
| Impact strength | | 16 | 14 | 13 | 12 | 23 | 21 | 17 |
| Flame retardancy | | N.R | N.R | N.R | N.R | N.R | N.R | N.R |

TABLE 4

| Classification | | Comparative Examples | | | | | | |
|---|---|---|---|---|---|---|---|---|
| | | 1 | 2 | 3 | 4 | 5 | 6 | 7 |
| (A) Base resin (parts by weight) | (A-1) | 100 | 100 | 100 | 100 | 100 | 100 | 100 |
| | (A-2) | — | — | — | — | — | — | — |
| | (A-3) | — | — | — | — | — | — | — |

TABLE 4-continued

|  |  | Comparative Examples | | | | | | |
|---|---|---|---|---|---|---|---|---|
| Classification | | 1 | 2 | 3 | 4 | 5 | 6 | 7 |
| (B) Additive (parts by weight) | (B-1) | — | — | — | — | — | — | — |
| | (B-2) | — | 0.05 | 6 | — | — | — | — |
| | (B-3) | — | — | — | — | — | — | — |
| | (B-4) | — | — | — | — | — | — | — |
| | (B-5) | — | — | — | 0.05 | 6 | — | — |
| (C) Metal salt of phosphinic acid (parts by weight) | | — | — | — | — | — | — | — |
| (D) Euphos HCA-HQ (parts by weight) | | — | — | — | — | — | — | — |
| (E) GC FR 693 (parts by weight) | | — | — | — | — | — | 2 | — |
| (F) GC FR 150 (parts by weight) | | — | — | — | — | — | — | 2 |
| Whiteness index | | 62 | 62 | 80 | 62 | 81 | 62 | 63 |
| Glossiness | | 97 | 99 | 95 | 99 | 99 | 89 | 84 |
| Impact strength | | 15 | 25 | 4 | 15 | 7 | 6 | 7 |
| Flame retardancy | | V-2 | V-2 | V-2 | V-2 | V-2 | V-2 | V-2 |

TABLE 5

|  |  | Comparative Examples | | | | |
|---|---|---|---|---|---|---|
| Classification | | 8 | 9 | 10 | 11 | 12 |
| (A) Base resin (parts by weight) | (A-1) | 30 | 30 | 30 | 30 | 30 |
| | (A-2) | 70 | 70 | 70 | 70 | 70 |
| | (A-3) | — | — | — | — | — |
| (B) Additive (parts by weight) | (B-1) | — | — | — | — | — |
| | (B-2) | — | 0.05 | 6 | — | — |
| | (B-3) | — | — | — | — | — |
| | (B-4) | — | — | — | — | — |
| | (B-5) | — | — | — | — | — |
| (C) Metal salt of phosphinic acid (parts by weight) | | — | — | — | 2 | — |
| (D) Euphos HCA-HQ (parts by weight) | | — | — | — | — | 2 |
| (E) GC FR 693 (parts by weight) | | — | — | — | — | — |
| (F) GC FR 150 (parts by weight) | | — | — | — | — | — |
| Whiteness index | | 63 | 65 | 81 | 64 | 65 |
| Glossiness | | 97 | 99 | 100 | 70 | 69 |
| Impact strength | | 23 | 24 | 7 | 6 | 16 |
| Flame retardancy | | N.R | N.R | N.R | N.R | N.R |

TABLE 6

|  |  | Comparative Examples | | | | |
|---|---|---|---|---|---|---|
| Classification | | 13 | 14 | 15 | 16 | 17 |
| (A) Base resin (parts by weight) | (A-1) | 30 | 30 | 30 | 30 | 30 |
| | (A-2) | — | — | — | — | — |
| | (A-3) | 70 | 70 | 70 | 70 | 70 |
| (B) Additive (parts by weight) | (B-1) | — | — | — | — | — |
| | (B-2) | — | 0.05 | 6 | — | — |
| | (B-3) | — | — | — | — | — |
| | (B-4) | — | — | — | — | — |
| | (B-5) | — | — | — | — | — |
| (C) Metal salt of phosphinic acid (parts by weight) | | — | — | — | 2 | — |
| (D) Euphos HCA-HQ (parts by weight) | | — | — | — | — | 2 |
| (E) GC FR 693 (parts by weight) | | — | — | — | — | — |
| (F) GC FR 150 (parts by weight) | | — | — | — | — | — |
| Whiteness index | | 65 | 65 | 85 | 63 | 65 |
| Glossiness | | 53 | 54 | 61 | 41 | 38 |
| Impact strength | | 17 | 15 | 8 | 9 | 11 |
| Flame retardancy | | N.R | N.R | N.R | N.R | N.R |

Referring to Table 1 to Table 6, it can be seen that Examples 1 to 10, which include poly(2,6-dimethyl-1,4-phenylene oxide) as a base resin, are excellent in a whiteness index, glossiness, impact strength, and flame retardancy. It can be seen that Examples 11 to 14, which include poly(2,6-dimethyl-1,4-phenylene oxide) and polystyrene as base resins, are excellent in a whiteness index, glossiness, and impact strength, but do not realize flame retardancy. It can be seen that Examples 15 to 17, which include poly(2,6-dimethyl-1,4-phenylene oxide) and high-impact polystyrene as base resins, have an excellent whiteness index and significantly excellent impact strength, but do not realize flame retardancy, and have slightly low glossiness. In the case of all of Examples 1 to 17, as the content of an additive increases, a whiteness index is improved, but impact strength is slightly lowered. Meanwhile, it can be seen that Comparative Example 1, which includes poly(2,6-dimethyl-1,4-phenylene oxide) as a base resin and does not include any additive, has a low whiteness index compared to Examples 1 to 10.

It can be seen that Comparative Example 2, which includes poly(2,6-dimethyl-1,4-phenylene oxide) as a base resin and diphenylphosphine at 0.05 part by weight as an additive, has a significantly low whiteness index compared to Examples 2 to 4. It can be seen that Comparative Example 3, which includes poly(2,6-dimethyl-1,4-phenylene oxide) as a base resin and diphenylphosphine at 6 parts by weight as an additive, has significantly low impact strength.

It can be seen that Comparative Example 4, which includes poly(2,6-dimethyl-1,4-phenylene oxide) as a base resin and 9,10-dihydro-9-oxa-10-phosphaphenanthrene-10-oxide at 0.05 part by weight as an additive, has a significantly low whiteness index compared to Examples 7 to 10. It can be seen that Comparative Example 5, which includes poly(2,6-dimethyl-1,4-phenylene oxide) as a base resin and 9,10-dihydro-9-oxa-10-phosphaphenanthrene-10-oxide at 6 parts by weight as an additive, has significantly low impact strength compared to Examples 7 to 10.

It can be seen that in the case of Comparative Examples 6 and 7 which include poly(2,6-dimethyl-1,4-phenylene oxide) as a base resin and compounds other than compounds represented by Chemical Formulas 1-1 to 1-3 as an additive, an effect of improving a whiteness index is not realized or insignificant, and glossiness and impact strength are significantly lowered.

It can be seen that Comparative Example 8, which includes poly(2,6-dimethyl-1,4-phenylene oxide) and polystyrene as base resins and does not include any additive, has a low whiteness index compared to Examples 11 to 14.

It can be seen that Comparative Example 9, which includes poly(2,6-dimethyl-1,4-phenylene oxide) and polystyrene as base resins and diphenylphosphine at 0.05 part by weight as an additive, has a low whiteness index compared to Examples 11 to 14. It can be seen that Comparative Example 10, which includes poly(2,6-dimethyl-1,4-phenylene oxide) and polystyrene as base resins and diphenylphosphine at 6 parts by weight as an additive, has significantly low impact strength compared to Examples 11 to 14.

It can be seen that Comparative Example 11, which includes poly(2,6-dimethyl-1,4-phenylene oxide) and polystyrene as base resins and aluminum diethyl phosphinate as an additive, exhibits an insignificant effect of improving a whiteness index, and has significantly low glossiness and significantly low impact strength. It can be seen that Comparative Example 12, which includes poly(2,6-dimethyl-1,4-phenylene oxide) and polystyrene as base resins and 10-(2,5-dihydrophenyl)-9,10-dihydro-9-oxa-10-phospha-phenanthrene-10-oxide as an additive, exhibits an insignificant effect of improving a whiteness index, and has significantly low glossiness.

It can be seen that Comparative Example 13, which includes poly(2,6-dimethyl-1,4-phenylene oxide) and high-impact polystyrene as base resins and does not include any additive, has a low whiteness index compared to Examples 15 to 17. It can be seen that Comparative Example 14, which includes poly(2,6-dimethyl-1,4-phenylene oxide) and high-impact polystyrene as base resins and diphenylphosphine at 0.05 part by weight as an additive, has a low whiteness index compared to Examples 15 to 17. It can be seen that Comparative Example 15, which includes poly(2,6-dimethyl-1,4-phenylene oxide) and high-impact polystyrene as base resins and diphenylphosphine at 6 parts by weight as an additive, has significantly low impact strength compared to Examples 15 to 17.

It can be seen that in the case of Comparative Example 16 which includes poly(2,6-dimethyl-1,4-phenylene oxide) and high-impact polystyrene as base resins and aluminum diethyl phosphinate as an additive, a whiteness index is rather lowered, and glossiness and impact strength are significantly lowered. It can be seen that Comparative Example 17, which includes poly(2,6-dimethyl-1,4-phenylene oxide) and polystyrene as base resins and 10-(2,5-dihydrophenyl)-9,10-dihydro-9-oxa-10-phospha-phenanthrene-10-oxide as an additive, exhibits no effect of improving a whiteness index, and has significantly low glossiness and significantly low impact strength.

From the above-described results, it can be seen that when only an appropriate amount of the compounds represented by Chemical Formulas 1-1 to 1-3 is used as an additive, it will be possible to produce a molded article excellent in both a whiteness index and impact strength.

The invention claimed is:
1. A thermoplastic resin composition comprising:
    a base resin comprising a polyarylene oxide-based polymer at 100 parts by weight; and
    an additive comprising one or more selected from the group consisting of compounds represented by Chemical Formula 7 or Chemical Formula 1-2 below at 0.1 to 5 parts by weight:

<Chemical Formula 7>

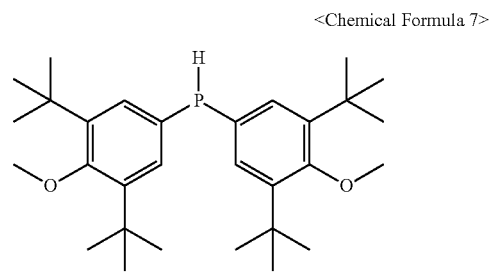 [SMILES: COc1c(C(C)(C)C)cc(Pc2cc(C(C)(C)C)c(OC)c(C(C)(C)C)c2)cc1C(C)(C)C]

<Chemical Formula 1-2>

In Chemical Formula 1-2,
$L_3$ and $L_4$ each independently are a direct bond, a divalent heteroatom, a substituted or unsubstituted $C_3$ to $C_{10}$ cyclic alkylene group, or a substituted or unsubstituted $C_6$ to $C_{20}$ arylene group, and
$R_3$ and $R_4$ each independently are hydrogen, a halogen group, a hydroxyl group, a cyano group, a nitro group, a substituted or unsubstituted $C_1$ to $C_{10}$ linear alkyl group, a substituted or unsubstituted $C_3$ to $C_{10}$ cyclic alkyl group, or a substituted or unsubstituted $C_6$ to $C_{20}$ aryl group.

2. The thermoplastic resin composition of claim 1, wherein the additive comprises one or more selected from the group consisting of compounds represented by Chemical Formula 3 to Chemical Formula 4 below:

<Chemical Formula 3>

<Chemical Formula 4>

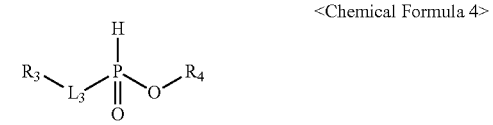

In Chemical Formula 3 to Chemical Formula 4,
$L_3$ each independently is a direct bond, a substituted or unsubstituted $C_3$ to $C_{10}$ cyclic alkylene group, or a substituted or unsubstituted $C_6$ to $C_{20}$ arylene group, and
$R_1$ to $R_4$ are as defined in Chemical Formula 1-2.

3. The thermoplastic resin composition of claim 1, wherein the additive comprises one or more selected from the group consisting of compounds represented by Chemical Formulas 8 to 14 below:

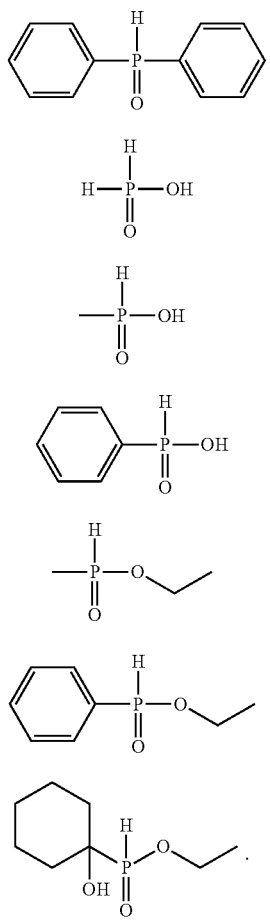

<Chemical Formula 8>
<Chemical Formula 9>
<Chemical Formula 10>
<Chemical Formula 11>
<Chemical Formula 12>
<Chemical Formula 13>
<Chemical Formula 14>

4. The thermoplastic resin composition of claim 1, wherein the base resin comprises a polyarylene oxide-based polymer comprising a repeat unit represented by Chemical Formula 16 below:

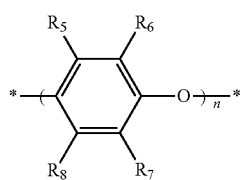

<Chemical Formula 16>

In Chemical Formula 16,
$R_5$ to $R_8$ each independently are hydrogen, a halogen group, a hydroxyl group, a cyano group, a nitro group, a substituted or unsubstituted $C_1$ to $C_{10}$ linear alkyl group, a substituted or unsubstituted $C_3$ to $C_{10}$ cyclic alkyl group, a substituted or unsubstituted $C_1$ to $C_{20}$ alkoxy group, or a substituted or unsubstituted $C_6$ to $C_{20}$ aryl group, and
n is any one of 4 to 700.

5. The thermoplastic resin composition of claim 4, wherein $R_5$ to $R_8$ each independently are hydrogen, a substituted or unsubstituted $C_1$ to $C_{10}$ linear alkyl group, a substituted or unsubstituted $C_1$ to $C_{20}$ alkoxy group, or a substituted or unsubstituted $C_6$ to $C_{20}$ aryl group.

6. The thermoplastic resin composition of claim 1, wherein the base resin comprises one or more selected from the group consisting of poly(2,6-dimethyl-1,4-phenylene oxide), poly(2,6-diethyl-1,4-phenylene oxide), poly(2-methyl-6-propyl-1,4-phenylene oxide), poly(2,6-dimethoxy-1,4-phenylene oxide), poly(2,6-dichloromethyl-1,4-phenylene oxide), poly(2,6-dibromomethyl-1,4-phenylene oxide), poly(2,6-diphenylphenylene oxide), and poly(2,5-dimethyl-1,4-phenylene oxide).

7. The thermoplastic resin composition of claim 1, wherein the base resin further includes an aromatic vinyl-based polymer.

8. The thermoplastic resin composition of claim 7, wherein the aromatic vinyl-based polymer is polystyrene.

9. The thermoplastic resin composition of claim 1, wherein the base resin further includes a graft copolymer prepared by graft polymerization of a conjugated diene-based polymer with an aromatic vinyl-based monomer.

10. The thermoplastic resin composition of claim 9, wherein the graft copolymer is high-impact polystyrene (HIPS).

11. A thermoplastic resin composition comprising:
a base resin comprising a polyarylene oxide-based polymer at 100 parts by weight; and
an additive comprising one or more selected from the group consisting of compounds represented by Chemical Formula 1-1 and Chemical Formula 1-2 below at 0.1 to 5 parts by weight:

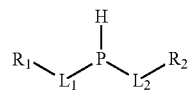

<Chemical Formula 1-1>

In Chemical Formula 1-1,
$L_1$ and $L_2$ each independently are a direct bond, a divalent heteroatom, a substituted or unsubstituted $C_3$ to $C_{10}$ cyclic alkylene group, or a substituted or unsubstituted $C_6$ to $C_{20}$ arylene group, and
at least one of $R_1$ and $R_2$ is a halogen group, a hydroxyl group, a cyano group, or a nitro group,

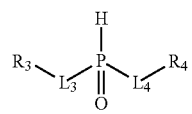

<Chemical Formula 1-2>

In Chemical Formula 1-2,
$L_3$ and $L_4$ each independently are a direct bond, a divalent heteroatom, a substituted or unsubstituted $C_3$ to $C_{10}$ cyclic alkylene group, or a substituted or unsubstituted $C_6$ to $C_{20}$ arylene group, and
$R_3$ and $R_4$ each independently are hydrogen, a halogen group, a hydroxyl group, a cyano group, a nitro group, a substituted or unsubstituted $C_1$ to $C_{10}$ linear alkyl group, a substituted or unsubstituted $C_3$ to $C_{10}$ cyclic alkyl group, or a substituted or unsubstituted $C_6$ to $C_{20}$ aryl group.

12. The thermoplastic resin composition of claim 11, wherein the base resin further includes a graft copolymer prepared by graft polymerization of a conjugated diene-based polymer with an aromatic vinyl-based monomer.

13. The thermoplastic resin composition of claim 12, wherein the graft copolymer is high-impact polystyrene (HIPS).

14. The thermoplastic resin composition of claim 11, wherein at least one of $R_1$ and $R_2$ is the halogen group, the cyano group, or the nitro group.

* * * * *